April 11, 1961  T. M. McCAULEY ET AL  2,978,748
DIE FOR EXTRUDING TUBULAR PLASTIC FILM
Filed Feb. 6, 1958

INVENTORS
THOMAS M. McCAULEY
GEORGE SVOBODA
by: Gary, Desmond & Parker
ATTYS.

2,978,748
DIE FOR EXTRUDING TUBULAR PLASTIC FILM

Thomas M. McCauley, La Grange, and George Svoboda, Western Springs, Ill., assignors to Koppers Company, Inc., Pittsburgh, Pa., a corporation of Delaware Filed Feb. 6, 1958, Ser. No. 713,693

8 Claims. (Cl. 18—14)

This invention relates to improvements in a die for extruding tubular plastic film and refers particularly to a die so contrived as to extrude a tube of uniform wall thickness.

In the extrusion of plastic film, the film is usually extruded as a cylindrical tube. The resulting tube is flattened and may be employed as a tube per se, or the tube may be longitudinally slitted whereby the film may be used as a sheet. In extruding the tube, the plastic material, such as polyethylene, is heated to a plastic condition and is forced under relatively high pressure through an annular orifice, a source of fluid under pressure being connected within the confines of the orifice whereby as the tube is extruded a body of fluid under pressure is established within the tube to distend the tube to the desired dimensions.

One of the difficulties encountered in extruding such a tube resides in uniformly feeding the plastic material to all portions of the annular orifice. If the plastic material fed to the orifice is not of uniform volume and pressure, the resultant tube wall thickness will be non-uniform.

As a feature of the present invention wherein the plastic material is fed under pressure to the die from a single source, the flow of plastic material from said source is so controlled that the portions of the die remote from the source will receive plastic material under a pressure which is substantially equal to the pressure of the plastic material adjacent the source and consequently the pressure of the plastic material around the circumference of the annular orifice is uniform and a tube of uniform wall thickness is extruded.

As a further feature of the invention, a movable annular gate is contemplated to exercise a further control of the pressure of the plastic material fed to the annular extruding orifice when plastics of extremely wide viscosity ranges are employed.

Other features and objects of the present invention will be apparent from the accompanying drawing and following detailed description.

Figure 1:
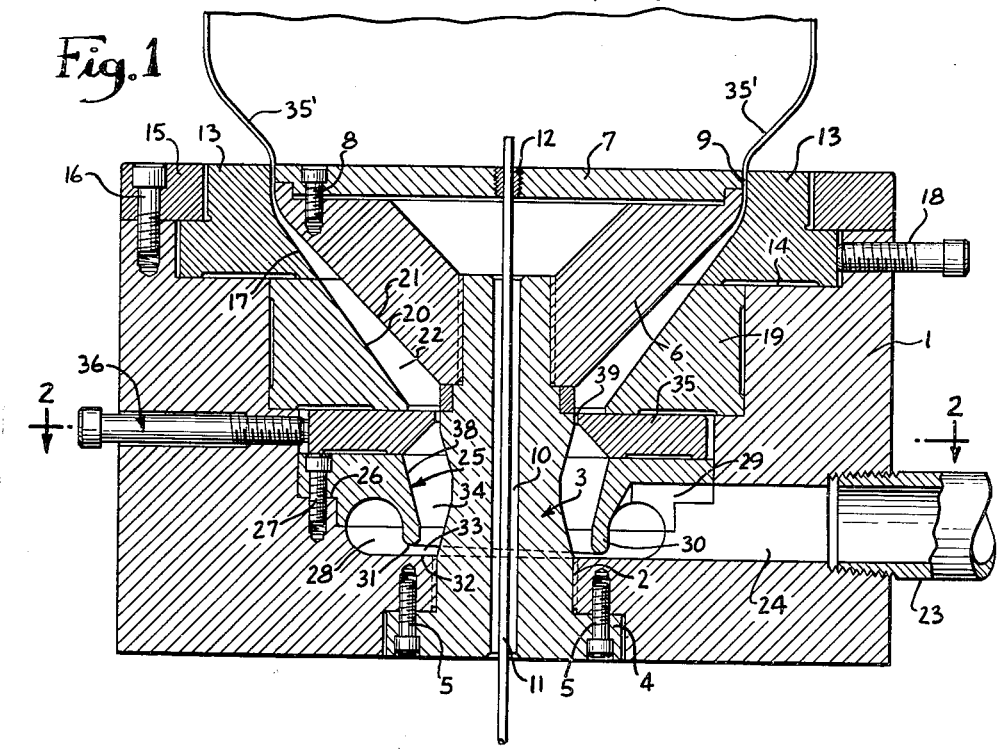
Fig. 1 is a transverse sectional view through a die which embodies the features of the present invention.
Figure 2:
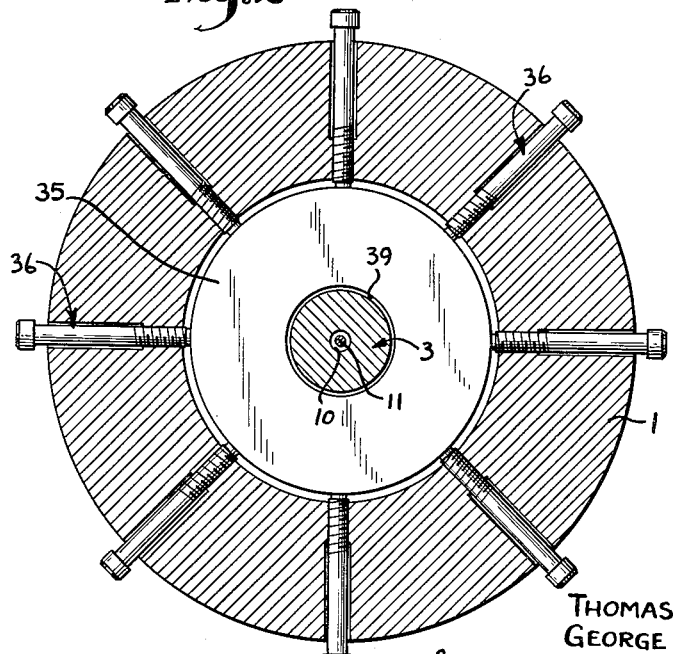
Fig. 2 is a horizontal sectional view taken on line 2—2 of Fig. 1.

Referring in detail to the drawing, 1 indicates a main body member of an extrusion die, the central portion of the body member being recessed to receive various die members, to be hereinafter more fully described. The bottom of the body member 1 is provided with a shouldered aperture 2 for the reception of an end portion of a post 3 which extends into the recessed portion of the body member. The end portion of the post 3 carries an annular flange 4 through which screws 5 extend, fastening the post to the body member.

At the opposite end of the post 3 an outwardly flaring conical element 6 is secured to the post, an orifice plate 7 being mounted upon the inverted base of the conical element and being secured thereto by circumferentially spaced screws 8, only one of which is shown. The outer periphery of the orifice plate defines the inner portion of an annular extrusion orifice 9. The post 3 is provided with an axial bore 10 through which a pipe 11 extends, said pipe passing through a bushing 12, threadedly secured to the orifice plate. The pipe 11 opens above the orifice plate 7, at one end, and at the other end, said pipe is connected to a source of fluid under relatively moderate superatmospheric pressure (not shown).

An orifice ring 13 is carried upon an annular shoulder 14 formed upon the interior of the body member 1, and a clamping ring 15 secured to the top of the body member by screws 16 (only one of which is shown). The inner surface of the orifice ring 13 is disposed adjacent the outer periphery of the orifice plate 7 and constitutes the outer defining wall of the annular orifice 9. Below the orifice 9, the inner wall of the orifice ring 13 is tapered conically inwardly, as shown best at 17 in Fig. 1.

A plurality of circumferentially spaced adjusting screws 18, only one of which is shown, are threaded through the wall of the body member 1 and the inner ends of said screws bear upon the outer surface of the orifice ring 13 whereby said ring may be moved radially relative to orifice plate 7 properly to dimension the radial width of the orifice 9.

An annular block 19 is positioned in the recess of the body member 1 beneath the orifice ring 13, the inner surface of said block having a conical surface 20 which is in substantial alignment with the surface 17 of the orifice ring. The apex angle of the outer surface 21 of the conical member 6 is smaller than the apex angle of the conical surfaces 17 and 20 and, hence, an annular space 22 is provided which converges upwardly toward orifice 9.

The elements hereinbefore described are conventional and do not per se constitute a portion of the present invention. It is with a die of this construction, however, that the concepts of the present invention may be employed.

A pipe 23 is threaded into a wall of the body member and connects with a bore 24 provided in said body portion. The opposite end of pipe 23 is connected to a conventional extruded (not shown) which reduces a suitable plastic, such as polyethylene resin, to a plastic state and urges it under relatively high pressure through pipe 23 to the bore 24.

A feed ring 25 is positioned in the recess in the body portion 1 and is secured in position at shoulder 26 by a plurality of circumferentially spaced screws 27, only one of which is shown. The feed ring is provided with an annular header chamber 28 which connects with a gated opening 29 which, in turn, connects with the bore 24. Partially defining the header chamber 28 is an annular wall 30 having a rounded lower edge 31 which is spaced from the bottom 32 of the body recess. Beneath the rounded edge 31 of the wall 30 a space 33 is provided which connects the header chamber 28 with a chamber 34 provided between the inner wall of the annular feed ring 25 and the outer surface of post 3.

The chamber 34 is annular, and, as will be hereinafter more fully described, connects with the annular tapered space 22 which leads to the orifice 9. Hence, the plastic material, in plastic condition and under pressure passes from bore 24 to header chamber 28; beneath wall 30 to the chamber 34; then to space 22 and to orifice 9.

To insure a tube wall 35' of uniform thickness throughout the circumference of the tube, the quantity of resin moving through all parts of the orifice for a predetermined period of time must be uniform. To insure this condition the quantity and pressure of the plastic material in the tapered space 22 must be uniform throughout the circumference of said space. This, in turn, requires a uniform quantity and pressure of plastic material in the chamber 34. It will be noted that the source of plastic material to the annular header 28 is at one area at the circumference of the header, namely at the gate 29. Unlike a true liquid, the plastic material employed has an appreciable viscosity and, hence, the pressure of said plastic as it flows around said header is reduced materially in proportion to its distance from the gate 29. Accordingly, the pressure of the plastic material adjacent the gate 29 is a maximum and gradually decreases to a minimum in the chamber 28 180° removed from the gate.

As a feature of the present invention the space 33 beneath the edge 31 of the wall 30 and the bottom 32 of the recess is gradually increased from adjacent the gate 29 to that portion 180° from the gate. Accordingly, the velocity of movement of plastic material beneath the edge 31 from the header chamber 28 to the chamber 34 gradually decreases from the vicinity of the gate 29 to a position 180° removed from the gate. However, in view of the fact that the pressure of the plastic material in the header chamber is not uniform throughout the circumference of the header, the change of velocity of the material beneath the edge 31 of wall 30 compensates for the change of pressure in the header 28 and, hence, the pressure of the material fed to the reservoir compartment is substantially uniform throughout the circumference of the compartment.

The volume of the reservoir compartment 34 is relatively large and, hence, turbulence due to the passage of the plastic material thereinto is damped before it passes to the tapered space 22.

It will be noted that the feed ring 25 with a predetermined tapered space 33 is a fixed control and can be employed with a predetermined range of viscosities. If materials having a different range of viscosities are to be employed, the feed ring 25 may be changed to a different feed ring having a different graduated space 33.

However, to widen the range of viscosities which may satisfactorily be employed with a predetermined feed ring, the following expedient may be employed.

An annular gate ring 35 may be positioned in the recess in the body 1 immediately above the feed ring 25. The gate ring 35 may be radially movable in said recess and a plurality of circumferentially spaced, radially extending adjusting screws 36 may be employed to adjustably position the gate ring relative to the post 3. The inner surface of the gate ring may be tapered, as shown best at 37 in Fig. 1, the tapered surface merging substantially with the inner surface 38 of the feed ring which partially defines the reservoir compartment 34, to decrease turbulence to a minimum. An annular communication space 39 is provided between the upper portion of the gate ring 35 and the post 3 which may be varied, as desired, by the manipulation of the adjusting screws 36.

Thus, the width of the space 39 may be varied which varies the rate of passage of the plastic material from the reservoir 34 to the tapered space 22. Hence, the pressure and volume of the material in the space 22 may be varied throughout its circumference which, of course, influences the pressure and volume of the material at the orifice 9.

By the use of the gate ring 35, the range of viscosities of plastic material which may be used with a predetermined feed ring, may be widened. In addition, the gate ring may be employed as a fine adjustment which is available to compensate for sudden changes in temperature and extruder pressure which, of course, influences the viscosity and flow of the plastic material.

It is to be understood that the present invention is not to be limited to the specific type of die shown and described, but broadly contemplates use wherever equalization of plastic flow is desired. Hence, it is not intended that the invention be limited to the exact details shown and described except as necessitated by the appended claims.

We claim as our invention:

1. A die for extruding tubular plastic film which comprises in combination: a die body, said body being provided with an annular recess, a post positioned in said recess and defining with said body at one end of said recess an annular extrusion orifice, an annular feed ring carried by said body in said recess and terminating at the opposite end of said recess from said extrusion orifice, said ring partially defining an annular header chamber substantially coaxial with said extrusion orifice and said recess, single means carried by said body for feeding plastic material in plastic condition under pressure at a predetermined small portion of said header chamber, an edge of said feed ring remote from said extrusion orifice and a portion of said body defining an end of said recess together defining a fixed annular communicating space between said header chamber and an annular chamber defined by said center post and said feed ring for the flow of plastic from said header chamber to said annular chamber, said annular chamber being relatively large whereby turbulence due to the flow of plastic material thereinto is damped, said communicating space increasing in width from said predetermined portion of said header chamber to a portion removed substantially 180° therefrom so that the pressure of the plastic fed to said recess is maintained substantially uniform throughout the circumference of said recess whereby said plastic material is uniformly fed to all portions of said orifice.

2. A die for extruding tubular plastic film which comprises in combination: a die body, said body being provided with an annular recess, a post positioned in said recess and defining with said body at one end of said recess an annular extrusion orifice, an annular feed ring carried by said body in said recess and terminating at the opposite end of said recess from said extrusion orifice, said ring partially defining an annular header chamber substantially coaxial with said extrusion orifice and said recess, single means carried by said body for feeding plastic material in plastic condition under pressure at a predetermined small portion of said header chamber, an edge of said feed ring with a portion of said body defining an end of said recess together defining a fixed annular communicating space between said header chamber and an annular chamber defined by said center post and said feed ring for the flow of plastic from said header chamber to said annular chamber, said annular chamber being relatively large whereby turbulence due to the flow of plastic material thereinto is damped, said communicating space being remote from said extrusion orifice and gradually increasing in width along said edge of said ring from said predetermined portion of said header chamber to a portion removed substantially 180° therefrom so that the pressure of the plastic fed to said annular chamber is maintained substantially uniform throughout the circumference of said annular chamber whereby said plastic material is uniformly fed to all portions of said extrusion orifice.

3. A die for extruding tubular plastic film which comprises in combination: a die body, said body being provided with an annular recess, a post positioned in said recess and defining with said body at one end of said recess an annular extrusion orifice, an annular feed ring carried by said body in said recess and terminating at the opposite end of said recess from said extrusion orifice, said ring partially defining with an interior portion of said body an annular header chamber substantially circumscribing said recess, single means carried by said body for feeding plastic mateiral in plastic condition under pressure at a predetermined small portion of said header chamber, an edge of said feed ring remote from said extrusion orifice with a portion of said body defining said recess defining a fixed annular communicating space between said header chamber and an annular chamber defined by said center post and said feed ring for the flow of plastic from said header to said annular chamber, said annular chamber being relatively large whereby turbulence due to the flow of plastic material thereinto is damped, said fixed annular communicating space increasing in width from said predetermined portion of said header compartment to a portion removed 180° therefrom so that the pressure of the plastic fed to said recess is maintained substantially uniform throughout the circumference of said annular chamber whereby said plastic material is uniformly fed to all portions of said extrusion orifice.

4. A die for extruding tubular plastic film, which comprises in combination: a die body, said body being provided with an annular recess, a post positioned in said recess and defining with said body at one end of said recess an annular extrusion orifice, an annular feed ring positioned in said anular recess, said feed ring with a portion of the interior portion of said body defining an annular header chamber substantially coaxial with said extrusion orifice, means carried by said die body for feeding plastic material in plastic condition under pressure at a predetermined small portion of said header chamber, an annular portion of said feed ring together with a portion of said body defining said recess defining a fixed annular communicating space between said header chamber and an annular chamber defined by said center post and said feed ring for the flow of plastic from said header chamber to said annular chamber, said annular chamber being relatively large whereby turbulence due to the flow of plastic material thereinto is damped, said fixed annular communicating space being remote from said extrusion orifice and increasing in width from said predetermined portion of said header chamber to a portion removed substantially 180° therefrom, so that the pressure of the plastic fed to said annular chamber is maintained substantially uniform throughout the circumference of said annular chamber, whereby said plastic material is uniformly fed to all portions of said extrusion orifice.

5. A device as claimed in claim 4, wherein said feed ring is removably secured to said annular recess.

6. A die for extruding tubular plastic film which comprises in combination: a die body, said body being provided with an annular recess which opens at one end of said body, a post positioned in said recess, and defining with said body at said opened end an annular extrusion orifice, a feed ring positioned in the opposite end of said recess in said body and circumscribing said post, said feed ring partially defining an annular header chamber substantially coaxial with said post, single means carried by said body for feeding plastic material in plastic condition under pressure at a predetermined portion of said header chamber, a fixed annular portion of said feed ring together with a portion of the body defining said recess defining a fixed annular communicating space circumscribing said post and providing communication between said header chamber and said recess for the flow of plastic from said header chamber to said recess, said recess being relatively large, whereby turbulence due to the flow of plastic material thereinto is damped, said fixed annular communicating space being remote from said extrusion orifice and increasing in width from said predetermined portion of said header chamber to a portion removed substantially 180° therefrom so that the pressure of the plastic fed to said annular chamber is maintained substantially uniform throughout the circumference of said annular chamber whereby said plastic material is uniformly fed to all portions of said extrusion orifice.

7. A die for extruding tubular plastic film which comprises in combination: a die body, said body being provided with an annular recess which opens at one end of said body, a post positioned in said recess, and defining with said body at said open end an annular extrusion orifice, a feed ring positioned in the opposite end of said recess in said body and circumscribing said post, said feed ring partially defining an annular header chamber substantially coaxial with said post, single means carried by said body for feeding plastic material in plastic condition under pressure at a predetermined portion of said header chamber, an annular portion of said feed ring together with a portion of said body defining said recess defining a fixed annular communicating space circumscribing said post and providing communication between said header chamber and said recess for the flow of plastic from said header chamber to said recess, said recess being relatively large whereby turbulence due to the flow of plastic material thereinto is damped, said annular communicating space increasing in width from said predetermined portion of said header chamber to a portion removed substantially 180° therefrom so that the pressure of the plastic fed to said recess is maintained substantially uniform throughout the circumference of said recess whereby said plastic material is uniformly fed to all portions of said extrusion orifice, an annular gate carried by said body in said recess, said gate circumscribing an intermediate portion of said post, the inner portion of said gate together with said post defining a relatively restricted annular passageway, and means carried by said body for radially moving said gate to change the width of said passageway throughout its circumference.

8. An extrusion die, comprising a body forming an annular recess, a post positioned in said recess, and defining with said body at one end of said recess an annular extrusion orifice for extruding molten plastic as tubular film, and at the other end of said recess, an annular header chamber, a single means connected to a predetermined portion of said header chamber for feeding plastic material in plastic condition under pressure to said header chamber whereby the viscosity of said plastic tends to cause the pressure of said plastic material in said header chamber to decrease from said predetermined portion to a portion 180° removed therefrom in proportion to the distance of said plastic material from said predetermined portion, and means forming a fixed annular communicating space between said header chamber and said recess increasing in width from said predetermined portion to a portion 180° removed therefrom so that the pressure of said plastic fed to said recess is maintained substantially uniform throughout the circumference of said recess, said recess being relatively large, whereby turbulence due to the passage of plastic material thereinto is damped as it passes to said extrusion orifice.

References Cited in the file of this patent

UNITED STATES PATENTS

| | | |
|---|---|---|
| 2,438,974 | Jones | Apr. 6, 1948 |
| 2,607,078 | Grimes | Aug. 19, 1952 |
| 2,612,656 | Lyon | Oct. 7, 1952 |
| 2,633,602 | Sverdrup | Apr. 7, 1953 |
| 2,709,834 | Johnson | June 7, 1955 |
| 2,824,337 | Covington et al. | Feb. 25, 1958 |